United States Patent
Wang et al.

(10) Patent No.: US 10,651,589 B1
(45) Date of Patent: May 12, 2020

(54) STACK TYPE FEMALE CONNECTOR

(71) Applicant: AMPHENOL EAST ASIA ELECTRONIC TECHNOLOGY (SHEN ZHEN) CO., LTD., Shen Zhen, Guangdong Province (CN)

(72) Inventors: Xiang Wang, Shen Zhen (CN); Lei Liao, Shen Zhen (CN); Nian Dai, Shen Zhen (CN)

(73) Assignee: Amphenol East Asia Electronic Technology (Shen Zhen) Co., Ltd., Shen Zhen, Guangdong Province (CN)

( * ) Notice: Subject to any disclaimer, the term of this patent is extended or adjusted under 35 U.S.C. 154(b) by 0 days.

(21) Appl. No.: 16/450,008

(22) Filed: Jun. 24, 2019

(51) Int. Cl.
*H01R 13/518* (2006.01)
*H01R 12/71* (2011.01)
*H01R 12/70* (2011.01)

(52) U.S. Cl.
CPC ....... *H01R 13/518* (2013.01); *H01R 12/7052* (2013.01); *H01R 12/716* (2013.01)

(58) Field of Classification Search
CPC . H01R 13/518; H01R 12/7052; H01R 12/716
See application file for complete search history.

(56) References Cited

U.S. PATENT DOCUMENTS

| | | | |
|---|---|---|---|
| 9,564,714 B1* | 2/2017 | Wang | H01R 13/6461 |
| 10,283,910 B1* | 5/2019 | Chen | H01R 4/04 |
| 2019/0097335 A1* | 3/2019 | Kee Mew | H01R 12/716 |

* cited by examiner

*Primary Examiner* — Abdullah A Riyami
*Assistant Examiner* — Nader J Alhawamdeh
(74) *Attorney, Agent, or Firm* — Muncy, Geissler, Olds & Lowe, P.C.

(57) ABSTRACT

A stack type female connector includes a terminal assembly, a main body, and a shell, wherein the terminal assembly is inserted in the main body. A board end is at a bottom part of the terminal assembly for being inserted on a PCB. A plugging end is at an anterior part of the terminal assembly for connecting a SSD interface. The terminal assembly has an upper terminal assembly and a lower terminal assembly, wherein both of the upper terminal assembly and the lower terminal assembly have a 40-pin terminal member and a 28-pin terminal member. The 28-pin terminal member is formed of a 15-pin terminal member, a 7-pin terminal member, and a 6-pin terminal member inserted in the terminal pedestal. The stack type female connector achieves a simplified structure, a lower production cost, and a better heat dissipation performance through an optimized design of the structure.

5 Claims, 3 Drawing Sheets

STACK TYPE FEMALE CONNECTOR

BACKGROUND OF THE INVENTION

1. Field of the Invention

The present invention relates to connectors, and more particularly, to a stack type female connector.

2. Description of the Related Art

In an application scenario of currently used enterprise-level commercial server, a connector, such as a SAS connector and a PSAS vertical connector, used to be connected with a SSD (solid state disk) for a high-speed transmission generally includes a combination of a female head, a middle plate, and a pair of backplane connectors (male and female). The aforementioned connector has shortcomings of a complex structure, a higher production cost, and a poor heat dissipation performance.

SUMMARY OF THE INVENTION

For improving shortcomings mentioned above, the present invention provides a stack type female connector having a simplified structure, a lower production cost, and a better heat dissipation performance through an optimized design of a structure thereof.

In more detail, the stack type female connector includes a terminal assembly, a main body, and a shell, wherein the terminal assembly is inserted into the main body. A board end is disposed on a bottom part of the terminal assembly for being inserted on a printed circuit board (PCB). A plugging end is disposed at an anterior part of the terminal assembly for connecting a solid state drive (SSD) interface. A terminal pedestal of the board end is perpendicular to a terminal pedestal of the plugging end. The terminal assembly has an upper terminal assembly and a lower terminal assembly, wherein both of the upper terminal assembly and the lower terminal assembly have a 40-pin terminal member and a 28-pin terminal member. The 28-pin terminal member is formed of a 15-pin terminal member, a 7-pin terminal member, and a 6-pin terminal member inserted on the same terminal pedestal. The upper terminal assembly has a structure in which the 40-pin terminal member is arranged at an upper part of the upper terminal assembly. The lower terminal assembly has a structure in which the 40-pin terminal member is arranged at a lower part of the upper terminal assembly.

Preferably, the 15-pin terminal member and the 7-pin terminal member are combined to be used for connecting a SAS male connector. The 40-pin terminal member, 15-pin terminal member, the 7-pin terminal member, and the 6-pin terminal member are combined to be used for connecting a PSAS male connector.

Preferably, the main body includes two SSD insertion holes and a heat dissipation hole, wherein the heat dissipation hole is arranged between the two SSD insertion holes.

Preferably, the shell is formed of a metal material, and is mounted on a posterior part of the terminal assembly. The shell has a heat dissipation grating arranged at a middle part thereof.

Preferably, the stack type female connector has a locking pin disposed at two sides of the main body, respectively, for positioning and inserting the main body on the PCB.

As will be readily understood from the foregoing description, the present invention is characterized by that the stack type female connector having an optimized structure achieves a simplified structure, a lower production cost, and a better heat dissipation performance, compared to an orthogonal connector of a prior art. In detail, firstly, the stack type female connector has a plurality of terminal members, such as the 40-pin terminal member, the 15-pin terminal member, the 7-pin terminal member, and the 6-pin terminal member, that are combined to be connected with the PSAS or SAS orthogonal connector. Secondly, the lower terminal assembly is a forward model whose 40-pin terminal member is arranged at a lower part thereof, and the upper terminal assembly is a reverse model whose 40-pin terminal member is arranged at an upper part thereof. Therefore, the two 40-pin terminal member are combined to form an 80-pin terminal member disposed on an outer side of the terminal assembly, which is able to be used for a PCIe high-speed signal transmission, achieving a structure of the 80-pin terminal member favorable for a coplanarity check on the production line, also facilitating a wiring for the high-speed digital signal transmission on the PCB. Thirdly, the main body and the shell have the heat dissipation hole and the heat dissipation grating, respectively, for the better heat dissipation performance. Fourthly, the metal shell is able to be fixed on the target product for preventing a reliability problem during insertion and vibration process.

DETAILED DESCRIPTION OF THE INVENTION

FIG. 1 to FIG. 4 and embodiments are provided for a detailed description. However, the present invention is not limited to the description hereby provided.

Embodiment 1

Figure 1:
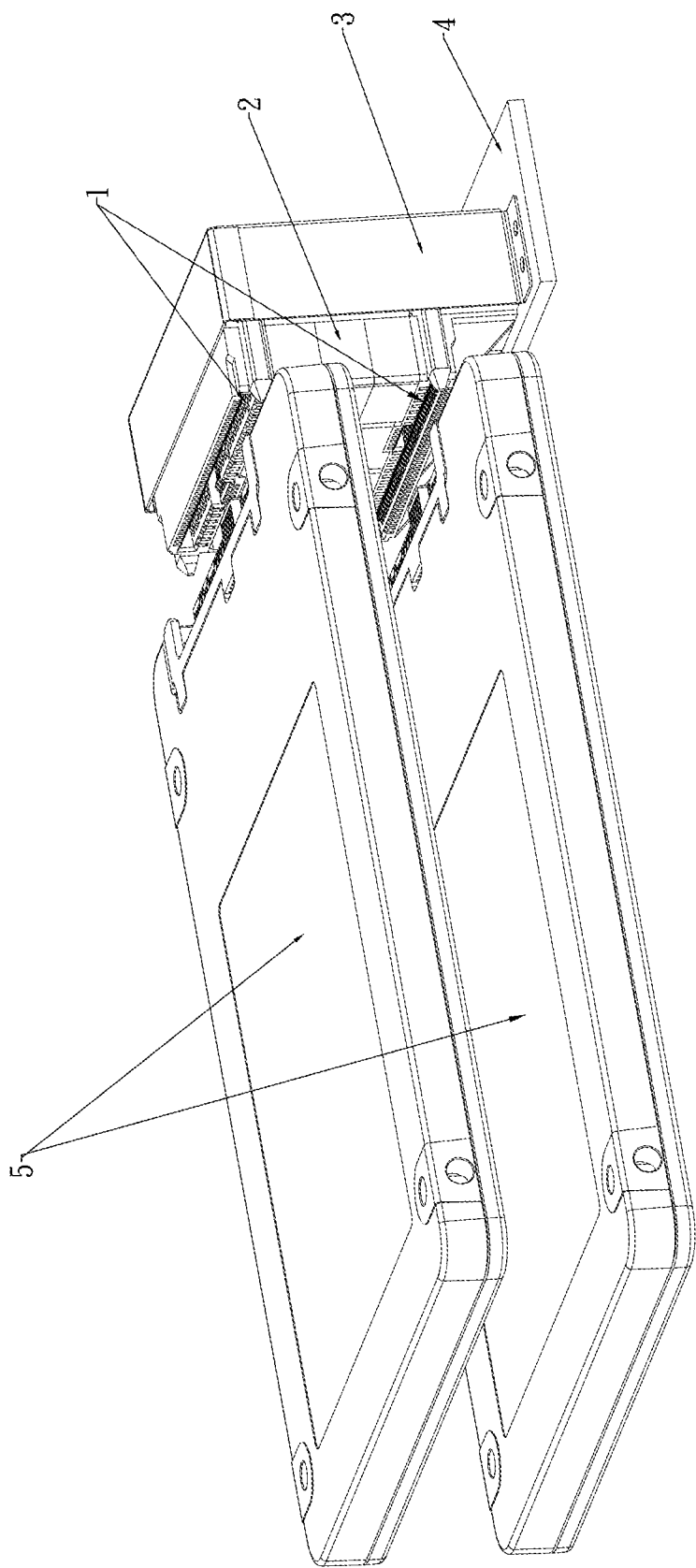
FIG. 1 is a schematic view illustrating a combination status of the stack type female connector in accordance with an embodiment of the present invention.
Figure 4:
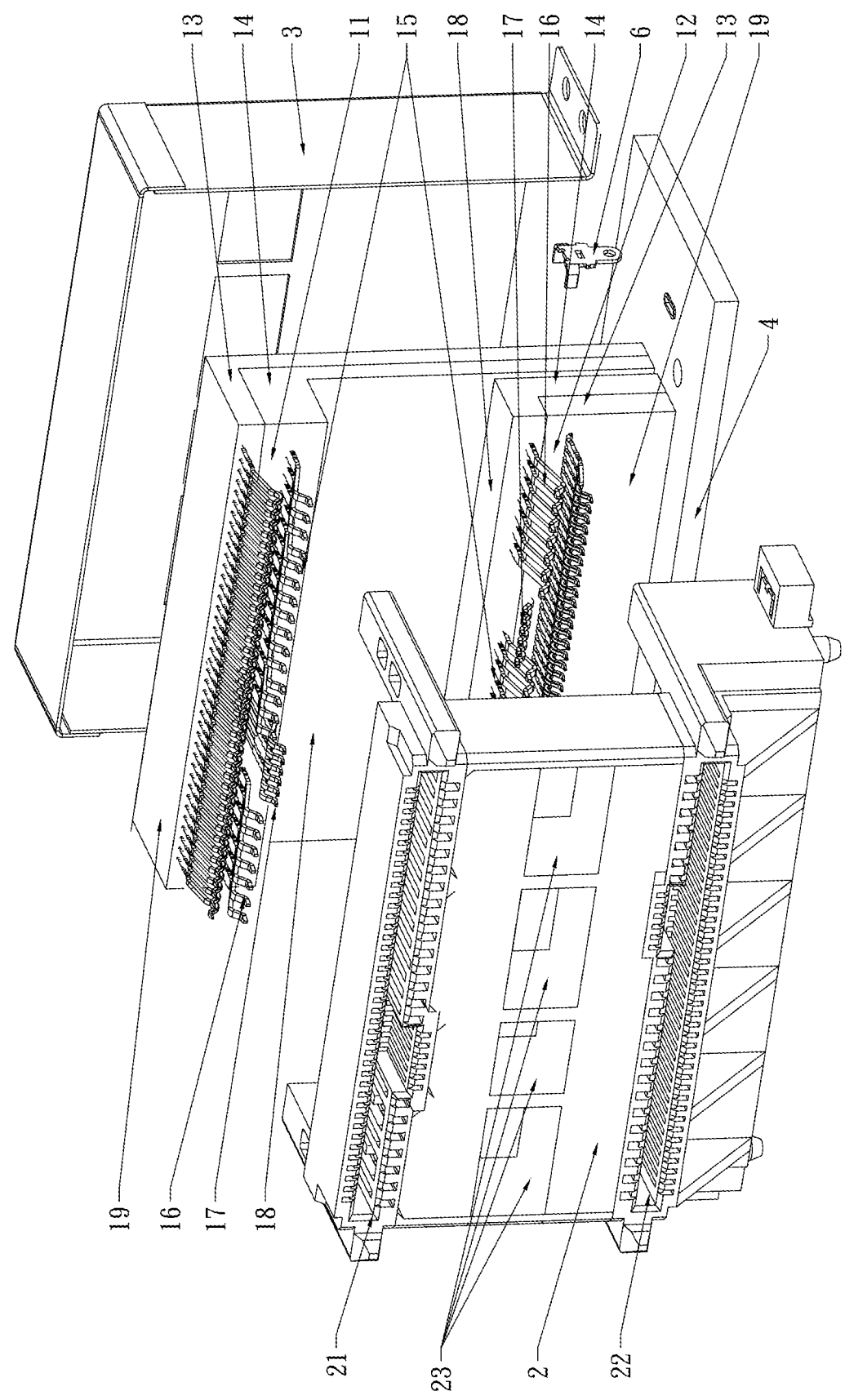
FIG. 4 is an exploded view of the stack type female connector

A stack type female connector as shown in FIG. 1, includes a terminal assembly 1, a main body 2, and a shell 3, wherein the terminal assembly 1 is inserted in the main body 2. A board end is formed at a bottom part of the terminal assembly 1 for being inserted on a printed circuit board (PCB) 4. A plugging end is formed at an anterior part of the terminal assembly 1 for connecting a solid state drive (SSD) 5 interface. As shown in FIG. 4, a terminal pedestal 18 of the board end is perpendicular to a terminal pedestal 19 of the plugging end. The terminal assembly 1 has an upper terminal assembly 11 and a lower terminal assembly 12, wherein both of the upper terminal assembly 11 and the lower terminal assembly 12 have a 40-pin terminal member 13 and a 28-pin terminal member 14. The 28-pin terminal member 14 is formed of a 15-pin terminal member 15, a 7-pin terminal member 16, and a 6-pin terminal member 17 inserted on the same terminal pedestal 18. The upper terminal assembly 11 has a structure whose 40-pin terminal member 13 is arranged at an upper part thereof. The lower terminal assembly 12 has a structure whose 40-pin terminal member 13 is arranged at a lower part thereof.

Preferably, the 15-pin terminal member 15 and the 7-pin terminal member 16 are combined to be used for connecting a SAS male connector. The 40-pin terminal member 13, 15-pin terminal member 15, the 7-pin terminal member 16, and the 6-pin terminal member 17 are combined to be used for connecting a PSAS male connector.

Embodiment 2

Figure 2:
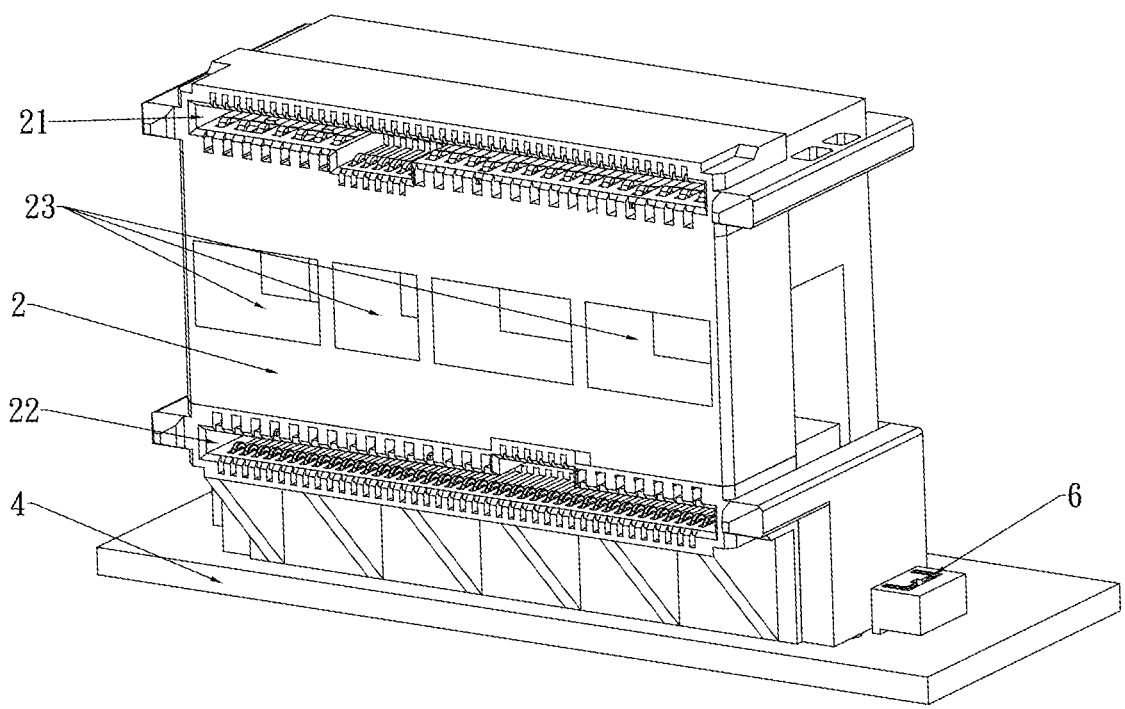
FIG. 2 is a front perspective view of the stack type female connector.
Figure 3:
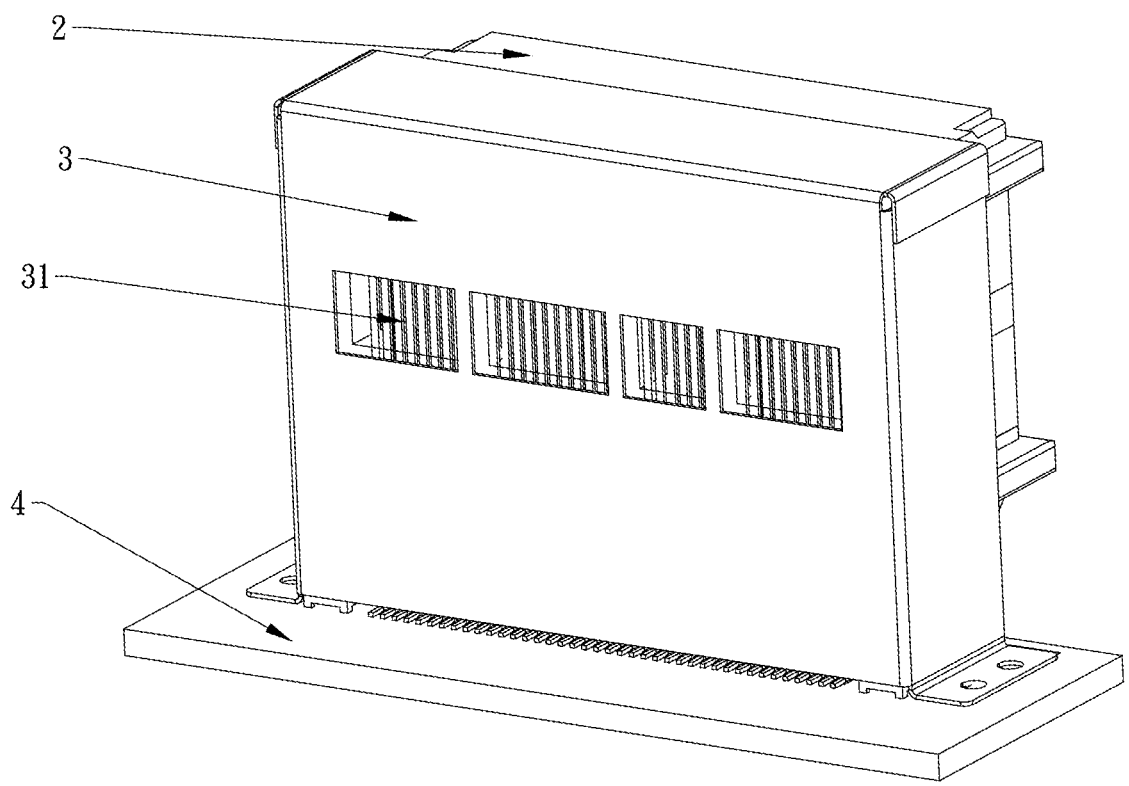
FIG. 3 is a rear perspective view of the stack type female connector.

Based on embodiment 1, as shown in FIG. 2 and FIG. 3, the main body 2 includes two SSD insertion holes 21, 22 and a heat dissipation hole 23, wherein the heat dissipation hole 23 is arranged between the two SSD insertion holes 21, 22.

The shell 3 is formed of a metal material, and is mounted on a posterior part of the terminal assembly 1. The shell 3 has a heat dissipation grating 31 arranged at a middle part thereof.

Embodiment 3

Based on the aforementioned embodiments, as shown in FIG. 4, the stack type female connector has a locking pin 6 disposed at two sides of the main body 2, respectively, for positioning and inserting the main body 2 on the PCB 4.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A stack type female connector, comprising:
a terminal assembly, a main body, and a shell;
the terminal assembly being inserted in the main body;
a board end being formed at a bottom part of the terminal assembly for being inserted on a printed circuit board;
a plugging end being disposed at an anterior part of the terminal assembly for connecting a solid state drive interface;
a terminal pedestal of the board end being perpendicular to a terminal pedestal of the plugging end;
the terminal assembly having an upper terminal assembly and a lower terminal assembly, wherein both of the upper terminal assembly and the lower terminal assembly have a 40-pin terminal member and a 28-pin terminal member;
the 28-pin terminal member being formed of a 15-pin terminal member, a 7-pin terminal member, and a 6-pin terminal member inserted on the same terminal pedestal;
the upper terminal assembly having a structure whose the 40-pin terminal member is arranged at an upper part thereof; the lower terminal assembly having a structure whose the 40-pin terminal member is arranged at a lower part thereof.

2. The stack type female connector of claim 1, wherein the 15-pin terminal member and the 7-pin terminal member are combined to be used for connecting a SAS male connector; the 40-pin terminal member, 15-pin terminal member, the 7-pin terminal member, and the 6-pin terminal member are combined to be used for connecting with a PSAS male connector.

3. The stack type female connector of claim 1, wherein the main body includes two SSD insertion holes and a heat dissipation hole, with the heat dissipation hole being arranged between the two SSD insertion holes.

4. The stack type female connector of claim 1, wherein the shell is formed of a metal material, and is mounted on a posterior part of the terminal assembly; the shell has a heat dissipation grating arranged at a middle part thereof.

5. The stack type female connector of claim 1, further comprising a locking pin disposed at two sides of the main body, respectively, for positioning and inserting the main body on the PCB.

* * * * *